(12) United States Patent
Paillet et al.

(10) Patent No.: US 9,002,756 B2
(45) Date of Patent: Apr. 7, 2015

(54) DATA COMPRESSION METHOD FOR A CLASSIFIER IN A TELECOMMUNICATION ENVIRONMENT UTILIZING AGGREGATION OF DATA OVER TIME PERIODS OF INCREASING LENGTH

(75) Inventors: Bruno Paillet, La Tronche (FR); Frederic Duclos, Grenoble (FR)

(73) Assignee: ACT750, Grenoble (FR)

( * ) Notice: Subject to any disclaimer, the term of this patent is extended or adjusted under 35 U.S.C. 154(b) by 292 days.

(21) Appl. No.: 13/177,320

(22) Filed: Jul. 6, 2011

(65) Prior Publication Data
US 2012/0016823 A1   Jan. 19, 2012

(30) Foreign Application Priority Data

Jul. 16, 2010  (FR) ...................................... 10 03008

(51) Int. Cl.
  G06Q 30/02  (2012.01)
  G06K 9/62  (2006.01)
  G06N 99/00  (2010.01)
(52) U.S. Cl.
  CPC .......... *G06Q 30/0201* (2013.01); *G06K 9/6256* (2013.01); *G06N 99/005* (2013.01)
(58) Field of Classification Search
  CPC ............................ G06N 99/005; G06N 9/6256
  USPC .......................................................... 706/12
  See application file for complete search history.

(56) References Cited

U.S. PATENT DOCUMENTS 8,260,826 B2 *  9/2012  Chen et al. .................... 707/803
  2007/0156673 A1  7/2007  Maga et al.
  2008/0084283 A1 *  4/2008  Kalik ............................ 340/435

OTHER PUBLICATIONS

Hadden et alia. Computer assisted customer churn management: State-of-the-art and future trends. Computers & Operations Research 34 (2005) 2902-2917.*
Wei et alia. Turning telecommunications call details to churn prediction: a data mining approach. Expert Systems with Applic.1ions 23 (2002) 103-112.*
Zhang et alia. Case Study on CRM: Detecting Likely Churners with Limited Information of Fixed-line Subscriber. International Conference on Service Systems and Service Management, Oct. 2006 (vol. 2), pp. 1495-1500.*
French Search Report dated Apr. 15, 2011 in French Patent Application No. 10 03008 (with translation).

* cited by examiner

*Primary Examiner* — Alan Chen
*Assistant Examiner* — Robert H Bejcek, II
(74) *Attorney, Agent, or Firm* — Oliff PLC

(57) ABSTRACT

A method of classifying a sample of values related to the use of a server, including: recording, by the server, use events in a log; configuring a classifier tool with a behavioral model formed of a weighted list of parameters, establishing a sample of values from the log, and supplying it to a classifier tool, which calculates a score representative of the adequacy of the sample to a target category, reading recent use events saved in the log and aggregating them over basic time intervals, storing the aggregation result obtained for each basic interval in a distinct record of a first group; aggregating, when the number of records of the first group reaches a threshold, the contents of the records of the first group in a distinct record of a second group, and establishing the sample from the contents of records of the database.

8 Claims, 2 Drawing Sheets

Fig 3A   J
         W
         M
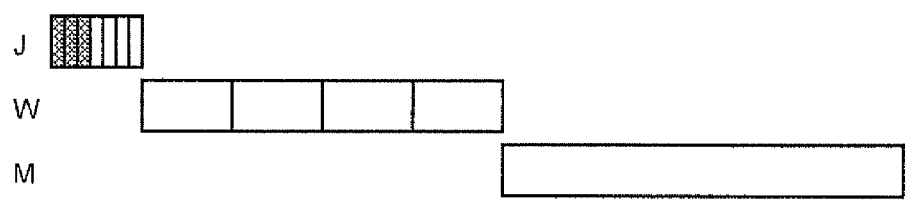
Fig 3B   J
         W
         M
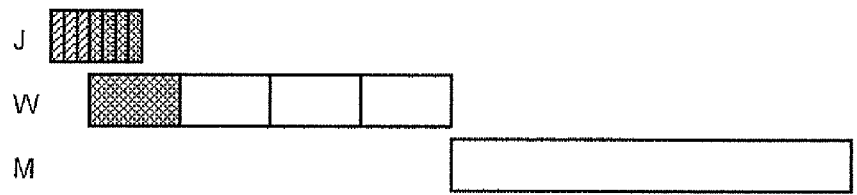
Fig 3C   J
         W
         M
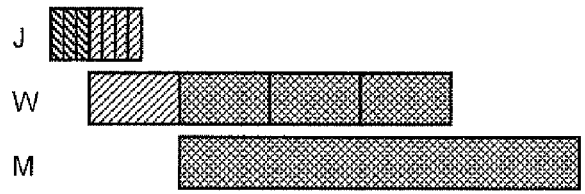

DATA COMPRESSION METHOD FOR A CLASSIFIER IN A TELECOMMUNICATION ENVIRONMENT UTILIZING AGGREGATION OF DATA OVER TIME PERIODS OF INCREASING LENGTH

TECHNICAL FIELD OF THE INVENTION

The invention relates to processing by a classifier of a log of events, in particular in the case where the log contains a very high quantity of data, on the order of several terabytes.

STATE OF THE ART

A "classifier" is a software tool generally based on neural networks and having learning capabilities. A classifier is supplied with successive samples of a list of parameters. For each sample, the classifier calculates a score representative of the adequacy of the sample to one or more target categories. In a learning mode, the classifier is supplied with reference samples with the corresponding expected categories. The classifier thus readjusts its neural network so that the scores tend towards the expected categories for these reference samples.

A common example of a classifier is a spam email filter, usually a Bayesian filter. Other classifiers of a more general usage exist under the denomination "Data Miner". Examples of such software are available under the commercial names "SAS Enterprise Miner", KXEN, and SPSS.

Data mining software may be used to extract useful information from immense data bases. These databases generally store the data in a form that is not easily handled by a classifier. The data must therefore be sorted and reformatted—the mass of data is such that the duration of the sorting and reformatting operations is predominant with respect to the duration for their processing by the classifier.

To illustrate this problem more concretely, the following description will be based on a specific example. Telephone service operators wish to estimate the risk of "churn", that is to say, the risk that a subscriber will change operators.

FIG. 1 schematically shows a conventional application environment of an analysis tool, such as that described patent application US 2007/0156673.

Several servers 10 dispense the call services to subscribers, update an internal history in the form of a "Call Data Records" or CDR log. A call data record is generated for each call placed by a subscriber and contains numerous pieces of information, such as the date and the duration of the call, the number called, the time remaining in the subscription period or on a time refill card, etc.

The logs 12 of each server 10 are regularly saved in a central database 14, often called a "data warehouse" or "data mart". It is upon this warehouse that the analysis tool or classifier 16 operates.

Tool 16 is designed to process multiple input parameters, and to supply a report 18 for each sample of parameter values, each sample corresponding to a different subscriber. Since the analysis tool 16 is generic, the nature of the parameters, their influence on the reports, and the contents of the reports may be configured to adapt the tool to the desired functionality.

The reports 18 are normally provided to display a score per subscriber, corresponding to the churn probability of the subscriber.

The data mining tool 16 cannot operate on the raw data contained in warehouse 14. These data must therefore be extracted and re-worked so that they have a practical significance that may be exploited by tool 16. In particular, statistical information, such as averages and tendencies, must be calculated over a large number of call data records per subscriber.

As a telephone operator may have millions of subscribers, the volume of data contained in warehouse 14 is immense. For example, for a telephone operator having several million subscribers, a year of call data records corresponds to several terabytes of data stored in warehouse 14. Even with the most powerful equipment, several days are needed to extract these data and to re-work them in order to establish a single report 18 for the ensemble of subscribers.

Moreover, tool 16 should be configured such that the estimations it produces is tend towards the actual situation. Tool 16 uses a behavioral model, generally in the form of a weighted list of parameters. A particular model is elaborated from the type of service offered and the behavior that one would like to detect, behavior that is common among subscribers about to churn for example Nevertheless, the habits of subscribers have a tendency to evolve for their own reasons, or under the influence of offers from competitors. As a result, the behavioral model should be continually adjusted. Given the time needed to establish a report, it is inconvenient to perform successive trials varying the parameters and using the learning functionalities offered by the data mining tools.

SUMMARY

There is therefore a need for a system based on a classifier that can supply results quickly from a large database.

To meet these goals, a method is provided for classifying a sample of values related to the use of a server, comprising the steps of recording, by the server, use events in a log; configuring a classifier tool with a behavioral model formed of a weighted list of parameters; establishing the sample of values from the log and supplying it as parameters to the classifier tool, whereby the classifier tool calculates a score representative of the adequacy of the sample to a target category; reading recent use events saved in the log and aggregating them over basic time intervals; storing in a database the aggregation result obtained for each basic interval in a distinct record of a first group; aggregating, when the number of records of the first group reaches a threshold, the contents of the records of the first group in a distinct record of a second group of the database; and establishing the sample of values supplied to the classifier tool from the contents of records of the database.

According to an embodiment, the records are used circularly in each group, such that old values contained in each record of the first group correspond to values aggregated in the last updated record of the second group.

According to an embodiment, the recent use events are aggregated by directly reading the log as it is updated by the server.

According to an embodiment, the method comprises the further steps of identifying samples that are effectively in the target category at the end of a reference period; configuring the classifier tool in learning mode; submitting the identified samples to the classifier tool, such that the classifier tool refines the behavioral model for conformance of the calculated score to the effective results; and setting the parameters of the classifier tool with the refined behavioral model to calculate the following scores.

According to an embodiment, the parameters of the behavioral model comprise statistical variables.

According to an embodiment, the statistical variables comprise tendencies, averages, maximum values, and minimum values over different durations.

According to an embodiment, the behavioral model comprises distinct parameters for the different groups of records.

According to an embodiment, the server supplies a telephone service, the target category corresponds to subscriber churn, and the method comprises the following steps: aggregating the recent use events of the log each day in a record of a first group of at least seven records; aggregating the contents of the records of the first group in a record of a second group of at least four records; and aggregating the contents of the records of the second group in a record of a third group of records.

According to an embodiment; the telephone service is based on prepaid refills, the parameters of the behavioral model comprising the amount of time until the refill expires; the amount of time since the last refill; the monthly tendency of the number of purchased refills; the amount of time since the last call; and the monthly deviation of the number of purchased refills.

BRIEF DESCRIPTION OF THE DRAWINGS

Other advantages and features will be clarified in the following description of particular embodiments provided for exemplary purposes only and illustrated with the aid of the appended drawings, in which:

FIGS. 3A to 3C show different data aggregation phases.

DESCRIPTION OF A PREFERRED EMBODIMENT

To speed up the preparation of data necessary for a data mining tool or classifier to calculate scores from a complex and voluminous history, a solution is provided that allows a considerable reduction of the size of the history as far as the data actually used by the classifier are concerned.

For this purpose, it is envisaged to aggregate the history in a dedicated database on the fly as it is supplied with new events. The aggregation can be done specifically on the data needed for the estimation, if necessary performing intermediate calculations upon these data.

Nevertheless, when the history is particularly large, for example in the case of a telephone operator with several million subscribers, a simple aggregation may be insufficient. Thus, several aggregation phases are provided, that is an aggregation on a group of short intervals for the most recent data, and an aggregation on groups of intervals that are longer and longer as the data grows old.

Indeed, as the inventors noticed, in the case of telephone subscribers, their reactions, such as churn, are preceded by rapid behavior evolutions. It is thus preferable to conserve the recent data with a finer granularity than the older data.

Figure 2:
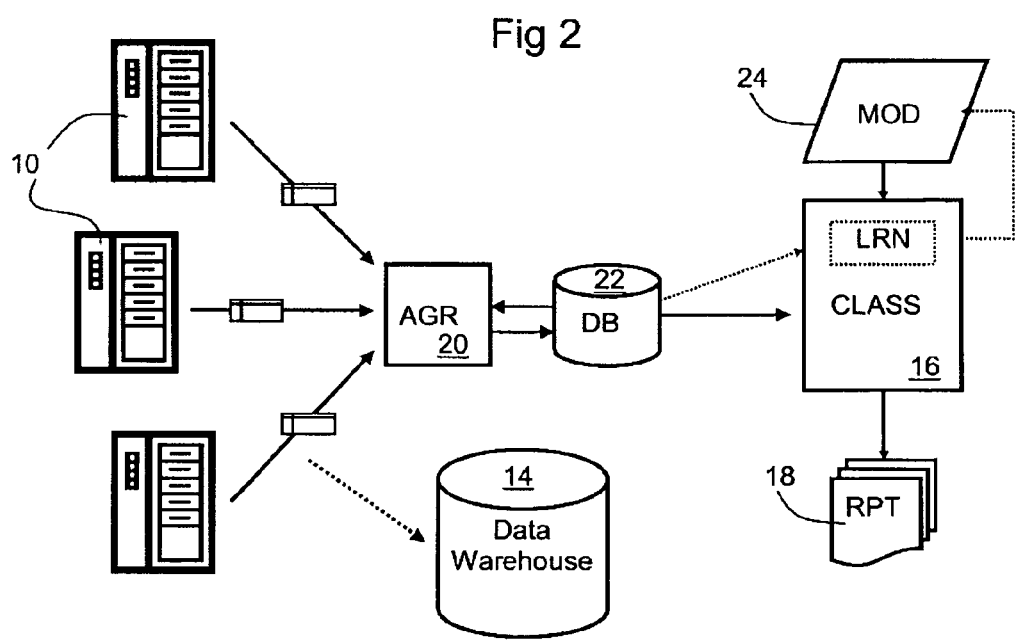
FIG. 2 shows a classifier implementation environment allowing rapid estimations to be performed.

FIG. 2 shows an implementation environment of a method allowing for a reduction of the history size, which will be described as an example in the framework of a telephone operator infrastructure. Even though the invention will be described using this particular framework, those skilled in the art will note that its use is not limited to such a framework. The invention applies to any infrastructure storing a voluminous history of events from which it is desired to extract useful indicators, such as the access history to a web or email server, to a database, etc.

Figure 1:
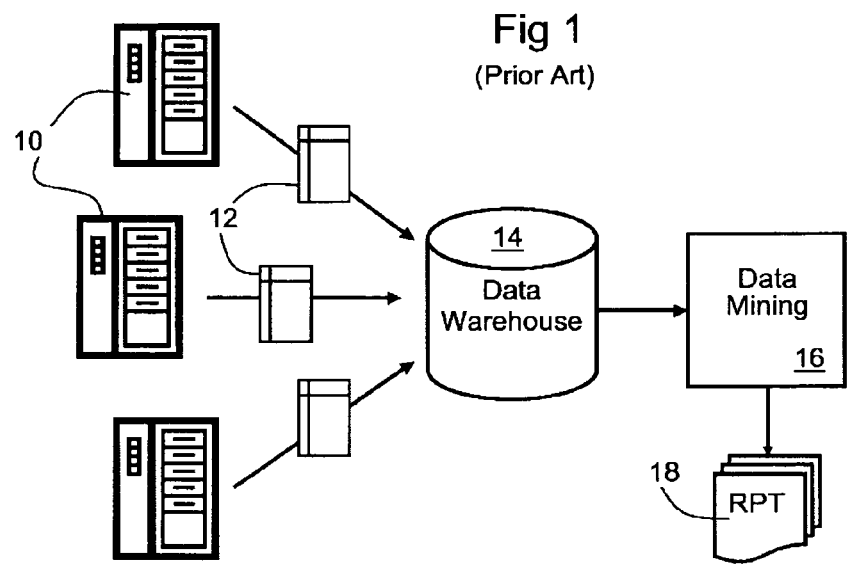
FIG. 1, previously described, shows a conventional classifier implementation environment.

As in FIG. 1, the logs produced by the servers 10 are saved in a data warehouse 14. The method described here does not use this data warehouse. An aggregation process 20 operates preferably on data read directly from the servers 10, fetching on the fly new call data written in the server logs. A call data record comprises several fields with the current values of variables that the operator wishes to monitor, for example the date of the call, the duration of the call, the amount of time remaining on a refill, the expiration date of the refill, etc. The values of interest of the call data records are aggregated in a database 22. This database 22 comprises a single record per subscriber, and per interval of aggregation time. Each of these records comprises a sample of parameter values to supply to the classifier 16, or allowing the desired values to be calculated.

The classifier 16 is of the learning type, for example a Bayesian classifier, which performs estimations from a behavioral model 24. The model 24, as previously indicated, is generally in the form of a weighted list of parameters. The role of the learning mode of classifier 16 will be described later.

As an example, to operate on the history of a year, three aggregation phases over three groups of intervals are provided. The first group comprises seven days J1 to J7. The second group comprises eight weeks W1 to W8. The last group comprises eleven months M1 to M11.

The second group may comprise four weeks, but it has been noted that a week was the most significant period and it was useful to have a higher number for calculating sliding averages. Thus, a second group of eight, or even sixteen, weeks is preferred.

The aggregated history of one year is thus available, with a granularity of one day for the most recent values, of one week for the intermediate values, and of one month for the oldest values. This corresponds to 26 records per subscriber. This number is to be compared with the number of call data records per year of a subscriber, that is, several per day over 365 days.

Moreover, numerous pieces of information in the call data records, that are not useful to the estimations, are not taken into consideration in the aggregation process 20. Daily aggregation thus allows the quantity of information to be reduced by a factor on the order of 500. The supplementary aggregations on the groups of longer time intervals for the older data, allows an additional factor of 14 to be gained.

Thus, several terabytes of data stored in data warehouse 14 for one year are brought to a quantity on the order of gigabytes, which may be easily handled by lower cost hardware and software, while guaranteeing the provision of an estimation report 18 within several minutes for several million subscribers. Some parameters that one wishes to supply to the classifier 16 may be determined directly from the call data records. Cumulative values are present, such as the number of calls, the duration of the calls, the number of refills bought, the amount of the refills, etc. It suffices to aggregate these values by the incrementation of counters. Instantaneous values or values constant over a period may also be obtained, such as the date of expiration of the subscription or of the refill, the amount remaining of the refill, the date of subscription, the date the last refill was bought, etc. It is preferred to save the date of an event in the form of the difference between the present date and the date of the event. It suffices to aggregate these values by overwriting the previous value with the current value.

It is moreover desired to supply statistics on the above-mentioned data, which are qualified as "primary data", to classifier 16. While these statistical parameters may be calculated from the ensemble of individual call data records contained in data warehouse 14, they cannot all be calculated from the aggregated primary data. Thus, preferably, the primary variables are enriched with statistical variables that cannot be calculated later from only the aggregated primary data. These statistical variables will be added to the database 22 in the same records as the primary variables. These statistical variables may include:

the tendency of each primary variable over a week, a month, a trimester, a year;

the weekly average over a month, a trimester, a year;

the weekly maximum and minimum over a month, a trimester, a year;

the weekly sliding average over a month, a trimester; and the deviation of the last period with respect to the sliding average.

The addition of these variables to the records considerably increases the quantity of data to store in the database 22. Nevertheless, the reduction factor of the quantity of data with respect to warehouse 14 remains largely sufficient. Other statistical variables that may be used as parameters for the classifier 16 may be calculated from the primary variables and statistics mentioned above. In this case, it is not useful to store them in records of the database 22. For example, the deviation of a primary value is determined by taking the difference between the primary value in the considered aggregation interval and the average value over the interval.

The value of each of the statistical variables to record may be determined, and aggregated, at the transitions between aggregation phases. For example, in the framework mentioned above using three aggregation phases to determine the tendency of a variable over a week, the calculation is prepared for the current week, where the aggregations are done per day. The tendency is calculated for each day as the difference between the value of the present day Ji and the value of the first day J1 of the week. At the end of the seventh day J7, one obtains, in the results of this day J7, the tendency for the week that just completed. The daily data of the completed week are therefore aggregated over a week W1 which becomes "the preceding week" for the new week which begins. The tendency calculated at day J7 becomes the tendency for the week W1.

In a general manner, the transition between one aggregation phase to the following, i.e. from an aggregation over short intervals to an aggregation over longer intervals, is done when an aggregation of data corresponding to a longer interval has been completed in the preceding phase.

For example, once aggregation has completed for the data of seven consecutive days J1 to J7, these data are aggregated to form the data of week W1. A new daily aggregation is begun until a new week is completed. Once a month of data aggregated over the groups of intervals J and W has been thus reached, these data are aggregated to form the data of month M1, and a new month is begun.

In order not to lose recent information at each transition, the daily J and weekly W variables are not reset but are used circularly. As a result, as will be understood below, the oldest data aggregated over a first group of intervals are redundant with the aggregated data of the last updated interval of the following group.

FIGS. 3A to 3C show three cases encountered when proceeding in this manner. Each box corresponds to an aggregation interval. The length of a box is representative of the duration of the corresponding interval. The daily J, weekly W, and monthly M intervals are shown in different rows.

In FIG. 3A, the daily J values have begun to be aggregated, shown by darkened boxes. The weekly W and monthly M variables are empty.

At the end of day J7, the daily aggregation for the present week is completed. The values of the completed week are aggregated in the first interval W The new week is begun by replacing the values of day J1, but the values of previous days J2 to J7 are kept, until they are replaced as the days pass.

One thus obtains a continually sliding week of aggregated data with a granularity of one day, even if the oldest information has already been aggregated over a weekly interval W.

In FIG. 3B, three days J of the new week have been processed, shown by the hatched boxes. The remaining daily intervals, not yet replaced, correspond to the first weekly interval W, which is shown as overlapping these daily intervals and with the same color.

The monthly transitions are performed in a similar manner: once the last day of the month has been reached, the data of the four completed weeks W1 to W4 and of completed days J1 to Ji of the current week are aggregated for the completed month. The aggregated data of the first day of the following month replaces the values of day Ji+1, but all the other daily and weekly data are conserved, and will be replaced as their turn comes.

One thus obtains a continually sliding month of aggregated data, with a granularity of one day for the most recent data, and of one week for the older data.

FIG. 3C illustrates this situation. Daily values are aggregated into three consecutive daily intervals J. The remaining daily intervals contain older values corresponding to the last updated weekly interval W, shown as overlapping these daily intervals. The other weekly intervals contain older data that have been aggregated in the first monthly interval M, shown as overlapping these weekly intervals and with the same color.

As it has previously been indicated, subscribers often change their habits, and as a result, the behavioral model 24 is preferably continually readjusted so that the estimations of the classifier 16 remain relevant. In a conventional infrastructure, the preparation of data for each interrogation of the classifier 16 could take several days. In this context, it is not conceivable to perform successive trials or to use the learning functionality of the classifier to refine the behavioral model.

The method of aggregation described allowing reduction by a considerable amount of the quantity of information to process, the time necessary for extracting and preparing the data for the classifier 16 is reduced by the same order. It thus becomes foreseeable to use the learning functionality of the classifier in a regular manner to adjust the model 24 according to the evolution of subscriber behavior, by proceeding in the following manner.

To begin, the behavioral model is initialized, which consists of choosing a set of parameters with a subset of discrete values possible for each parameter, and of attributing a weight to each parameter. This choice is done empirically, based on the know-how of the operator. The relevance of the initial model is not very important, because it will be refined by successive learning cycles.

As an example, in the frame of a telephone service with prepaid phone cards, the following parameters have been chosen to be among the most relevant:

the amount of time until the refill expires;

the amount of time since the last refill;

the monthly tendency of the amount of purchased refills;

the amount of time since the last call;

the monthly deviation of the number of purchased refills.

Then, an initial series of samples is prepared, for example one year of already aggregated data in the database 22, for which the effective churn results are known, that is to say, for which the category "subscriber left" has been verified. The classifier 16 is set in learning mode and is supplied with the series of samples and the category in which the classifier should have classified the samples, here "subscriber left". The classifier accordingly readjusts the weights of the parameters of the model for better conformance between its estimation and the effective results. A model that may serve as a basis for the first estimations is thus obtained.

During use, periodically or each time a sufficient number of new churns is noticed, the classifier 16 is again set in learning mode, and it is supplied with the samples for which the new churns were noted. The classifier readjusts the weights of the parameters of the model 24, and the resulting model is used for the new estimations.

To automate the process, one may establish a condition on the current data that determines whether a subscriber has left. In the framework of a telephone service with prepaid refill cards, it may be determined that a subscriber has left if, for example, he has not made a phone call or bought a refill in over thirty days.

Over successive learning cycles, the relevance of chosen parameters may be verified by examining their weights. If a weight is less than a threshold, it may be decided to delete the parameter from the model. New parameters may also be defined and the evolution of their weights over learning cycles may be noted to determine whether they are relevant.

The invention claimed is:

1. A method of classifying a sample of values related to the use of a telephone service, the method comprising the steps of:
   (a) recording call data records in a server, each call data record identifying a subscriber to the telephone service and comprising at least a duration value and a date value;
   (b) reading on the fly the call data records from the server and identifying the call data records relative to the subscriber;
   (c) aggregating the identified call data records over a basic time interval in a respective database record assigned to the subscriber and the basic time interval, wherein
      the duration value of a current call data record is aggregated by incrementing a counter field of the database record, and
      the date value of the current call data record is aggregated by overwriting a respective field of the database record with the difference between the date value and a current date;
   (d) repeating step (c) for a number of successive basic time intervals, to form a first group of database records assigned to the subscriber;
   (e) when the first group is complete, aggregating the values of the database records of the first group in a database record assigned to the subscriber and an extended time interval;
   (f) repeating steps (c) thru (e) for a number of the extended time intervals, to form a second group of database records assigned to the subscriber;
   (g) configuring a classifier tool with a behavioral model formed of a weighted list of parameters;
   (h) forming a sample of values based on the contents of the first and second groups of database records; and
   (i) providing the sample of values as parameters to the classifier tool, whereby the classifier tool calculates a score representative of the adequacy of the sample with a target category.

2. The method according to claim 1, wherein the records are used circularly in each group.

3. The method according to claim 1, further comprising:
   identifying samples that are effectively in the target category at the end of a reference period;
   configuring the classifier tool in learning mode;
   submitting the identified samples to the classifier tool, such that the classifier tool refines the behavioral model for conformance of the calculated score to the effective results; and
   configuring the classifier tool with the refined behavioral model to calculate the following scores.

4. The method according to claim 1, wherein the parameters of the behavioral model comprise statistical variables.

5. The method according to claim 4, wherein the statistical variables comprise tendencies, averages, maximum values, and minimum values over different durations.

6. The method according to claim 1, wherein the behavioral model comprises distinct parameters for the different groups of records.

7. The method according to claim 1, wherein
   the target category corresponds to subscriber churn, and
   the method further comprises the following steps:
      aggregating the identified call data records each day in database records of a first group of at least seven records:
      aggregating the contents of the records of the first group in one record of a second group of at least four records; and
      aggregating the contents of the records of the second group in one record of a third group of records.

8. The method according to claim 7, wherein the telephone service is based on prepaid refills, the parameters of the behavioral model further comprising:
   the amount of time until the refill expires;
   the amount of time since the last refill;
   the monthly tendency of the number of purchased refills;
   the amount of time since the last call; and
   the monthly deviation of the number of purchased refills.

* * * * *